United States Patent
Okubo et al.

(10) Patent No.: US 7,442,218 B2
(45) Date of Patent: Oct. 28, 2008

(54) EXHAUST GAS TREATMENT APPARATUS

(75) Inventors: Masaaki Okubo, Sakai (JP); Toshiaki Yamamoto, Sakai (JP); Shinichi Miwa, Tajimi (JP)

(73) Assignees: NGK Insulators, Ltd., Nagoya (JP); Masaaki Okubo, Sakai-Shi (JP); Toshiaki Yamamoto, Sakai-Shi (JP)

( * ) Notice: Subject to any disclaimer, the term of this patent is extended or adjusted under 35 U.S.C. 154(b) by 513 days.

(21) Appl. No.: 10/523,685

(22) PCT Filed: Jul. 29, 2003

(86) PCT No.: PCT/JP03/09607

§ 371 (c)(1),
(2), (4) Date: Jun. 9, 2005

(87) PCT Pub. No.: WO2004/013469

PCT Pub. Date: Feb. 12, 2004

(65) Prior Publication Data

US 2005/0229564 A1    Oct. 20, 2005

(30) Foreign Application Priority Data

Aug. 5, 2002    (JP)    ............................. 2002-227920

(51) Int. Cl.
*B01D 46/00*    (2006.01)
*F01N 3/023*    (2006.01)

(52) U.S. Cl. .................. 55/282.3; 55/385.3; 55/495; 55/523; 55/524; 55/DIG. 10; 55/DIG. 30; 95/278; 60/295; 60/297; 60/303; 60/311

(58) Field of Classification Search ............... 55/282.2, 55/282.3, 385.3, 495, 490, 523, 524, DIG. 5, 55/DIG. 10, DIG. 30; 95/273, 278; 60/295, 60/297, 299, 300, 301, 303, 311
See application file for complete search history.

(56) References Cited

U.S. PATENT DOCUMENTS

| | | | |
|---|---|---|---|
| 5,595,581 A | * | 1/1997 | Ichikawa et al. ............. 55/523 |
| 5,711,147 A | | 1/1998 | Vogtlin et al. |
| 2001/0001435 A1 | | 5/2001 | Palekar et al. |

FOREIGN PATENT DOCUMENTS

| | | | |
|---|---|---|---|
| JP | 5-256124 | * | 10/1993 |
| JP | A-05-256124 | | 10/1993 |
| JP | 6-146852 | * | 5/1994 |

(Continued)

*Primary Examiner*—Jason M Greene
(74) *Attorney, Agent, or Firm*—Oliff & Berridge PLC

(57) ABSTRACT

The present invention is characterized in that a casing 2 connected to an exhaust system 8, a honeycomb filter 3 placed in the inside of the casing 2, the honeycomb filter having a plurality of cells partitioned by partition walls, and plasma generation electrodes 6 placed being faced each other by sandwiching the honeycomb filter there are included, particulate matter contained in an exhaust gas is collected by the honeycomb filter 3, nitrogen monoxide contained in the exhaust gas is oxidized to nitrogen dioxide by nonthermal plasma generated between a pulse electrode 4 and an earth electrode 5 constituting the plasma generation electrodes 6, combustible materials in the particulate matter collected and deposited on the surface of the partition walls are removed through oxidation by the nitrogen dioxide produced. As a result, the honeycomb filter 3 can be regenerated.

20 Claims, 11 Drawing Sheets

FOREIGN PATENT DOCUMENTS

| | | |
|---|---|---|
| JP | A-06-146852 | 5/1994 |
| JP | A-9-329015 | 12/1997 |
| JP | 2002-213228 * | 7/2002 |
| JP | A-2002-213228 | 7/2002 |
| WO | WO 99/12638 A1 | 3/1999 |
| WO | WO 00/43102 A2 | 7/2000 |
| WO | WO 01/59270 A1 | 8/2001 |

* cited by examiner

EXHAUST GAS TREATMENT APPARATUS

TECHNICAL FIELD

The present invention relates to an exhaust gas treatment apparatus. In particular, the present invention relates to an exhaust gas treatment apparatus capable of highly precisely collecting particulate matter contained in an exhaust gas with a honeycomb filter, removing combustible materials in the collected particulate matter simply by oxidation at low energy, and regenerating the honeycomb filter. In addition, the exhaust gas treatment apparatus can be miniaturized compared with a known exhaust gas treatment apparatus through the use of nonthermal plasma.

BACKGROUND ART

As regulations on exhaust gases are stepped up in emission of combustion gases generated from heat engines, e.g., internal combustion engines, or combustion apparatus, e.g., boilers, through exhaust systems, improvements are performed on the incineration of engines, for example, compositions of fuels are improved. On the other hand, exhaust gases emitted from the above-described internal combustion engines and the like are cleaned by using exhaust gas treatment apparatus provided with filters and the like. In particular, with respect to diesel engines of automobiles, exhaust gas treatment apparatus provided with porous honeycomb filters are used in order to collect and remove particulate matter, e.g., soot, contained in exhaust gases.

As shown in FIG. 19, the above-described honeycomb filter has a honeycomb structure in which a plurality of cells 82 partitioned by partition walls 81 to serve as filter flow paths of an exhaust gas are included and these cells 82 are plugged alternately at an exhaust-gas-inlet-side end surface 83 and an exhaust-gas-outlet-side end surface 84. The exhaust gas is flowed into the honeycomb filter 80 through cells 82 opened at the exhaust-gas-inlet-side end surface 83, and is forced to pass through the partition walls 81 in the honeycomb filter 80, so that particulate matter in the exhaust gas is collected and removed.

When large amounts of particulate matter is deposited on the surface of the partition walls 81 of such a honeycomb filter 80, the pressure drop of the honeycomb filter 80 is increased, and the performance of an engine may be reduced since a back pressure is applied to the exhaust system on the engine side. Therefore, the particulate matter deposited on the surface of the partition walls 81 must be periodically removed to regenerate the above-described honeycomb filter 80.

Examples of methods for regenerating the honeycomb filter 80 can include a method in which the particulate matter is burnt off by using an electric heater, an afterburner, or the like. However, in this case, the honeycomb filter must be heated to at least 600° C. and, thereby, nonuniform temperature distribution tends to occur in the inside of the honeycomb filter 80 subjected to rapid temperature change or local heat generation. As a result, the honeycomb filter 80 may be damaged.

Consequently, an exhaust gas treatment apparatus has been proposed, in which NO contained in an exhaust gas flowing into the exhaust gas treatment apparatus is oxidized to $NO_2$ having a high oxidation ability before the exhaust gas flows into the honeycomb filter 80, and combustible materials, e.g., soot, in the particulate matter deposited on the surface of the partition walls 81 of the honeycomb filter 80 are removed through oxidation by using the resulting $NO_2$.

Specific example thereof can include an exhaust gas treatment apparatus in which an oxidation catalyst is placed upstream of the exhaust-gas-inlet-side end surface 83 of the honeycomb filter 80, NO contained in an exhaust gas of a diesel engine or the like is oxidized to $NO_2$ by the above-described oxidation catalyst, and the honeycomb filter 80 can be regenerated by using the resulting $NO_2$. Another example is an exhaust gas treatment apparatus having a configuration in which a plasma generation device is placed upstream of the exhaust-gas-inlet-side end surface 83 of the honeycomb filter 80 instead of the above-described oxidation catalyst.

However, with respect to the exhaust gas treatment apparatus in which the oxidation catalyst is placed upstream of the exhaust-gas-inlet-side end surface 83 of the honeycomb filter 80, the temperature required to activate the oxidation catalyst is high, about 400° C.-500° C. Consequently, there are problems in that, for example, when the diesel engine is operated under low-speed and light-load conditions, the temperature of the exhaust system is low. Therefore, the oxidation catalyst is not activated, and the honeycomb filter 80 cannot be regenerated. In the case where the above-described operation of the diesel engine under low-speed and light-load conditions is continued for a long time and large amounts of particulate matter is deposited on the surface of the partition walls of the honeycomb filter, when the catalyst reaches the activation temperature, the deposited particulate matter is oxidized and burnt at a time. Consequently, there is a problem in that the temperature in the exhaust gas treatment apparatus is increased rapidly and, thereby, the honeycomb filter in the inside is damaged due to a thermal stress.

With respect to the exhaust gas treatment apparatus in which the plasma generation device is placed upstream of the exhaust-gas-inlet-side end surface 83 of the honeycomb filter 80, nonthermal plasma is generated by the above-described plasma generation device and, thereby, NO contained in the exhaust gas can be oxidized to $NO_2$ at a low temperature of 300° C. or less. However, there is a problem in that the exhaust gas treatment apparatus itself becomes too large to be equipped in an automobile or the like without constraints.

Furthermore, in the regeneration of the honeycomb filter, particulate matter can be effectively removed through oxidation when the exhaust gas containing $NO_2$ produced through oxidation by nonthermal plasma is in an excited state. However, with respect to the above-described exhaust gas treatment apparatus, a problem occurs in that the excited state is reduced and the efficiency of regeneration of the honeycomb filter is deteriorated since there is some distance between the nonthermal plasma and the honeycomb filter.

DISCLOSURE OF INVENTION

The present invention was made in consideration of the above-described problems. Accordingly, it is an object of the present invention to provide an exhaust gas treatment apparatus capable of removing soot deposited on the surface of partition walls of a honeycomb filter simply and at low energy.

In order to achieve the above-described object, the present invention provides the following exhaust gas treatment apparatus.

[1] An exhaust gas treatment apparatus placed in an exhaust system of a combustion gas and used for collecting and removing particulate matter contained in an exhaust gas, the treatment apparatus characterized by including a casing connected to the above-described exhaust system to serve as a main flow path of the above-described exhaust gas; a honeycomb filter placed in the inside of the above-described casing in such a manner that interrupts the above-described main flow path, the honeycomb filter having a plurality of cells partitioned by partition walls to serve as filter flow paths of the above-described exhaust gas and collecting the above-described particulate matter contained in the above-described exhaust gas; and plasma generation electrodes composed of a pulse electrode and an earth electrode placed being faced each other by sandwiching the honeycomb filter there, the plasma generation electrodes being capable of generating nonthermal plasma between the above-described pulse electrode and the above-described earth electrode, wherein the particulate matter contained in the above-described exhaust gas flowing into the above-described casing is collected by the above-described honeycomb filter, nitrogen monoxide contained in the above-described exhaust gas is oxidized to nitrogen dioxide by the nonthermal plasma generated between the above-described pulse electrode and the above-described earth electrode constituting the above-described plasma generation electrodes, combustible materials in the above-described particulate matter collected and deposited on the surface of the above-described partition walls are removed through oxidation by the above-described nitrogen dioxide produced and, thereby, the above-described honeycomb filter can be regenerated (hereafter may be referred to as a "first aspect").

[2] An exhaust gas treatment apparatus placed in an exhaust system of a combustion gas and used for collecting and removing particulate matter contained in an exhaust gas, the treatment apparatus characterized by including a casing connected to the above-described exhaust system to serve as a main flow path of the above-described exhaust gas; a honeycomb filter placed in the inside of the above-described casing in such a manner that interrupts the above-described main flow path, the honeycomb filter having a plurality of cells partitioned by partition walls to serve as filter flow paths of the above-described exhaust gas and collecting the above-described particulate matter contained in the above-described exhaust gas; and plasma generation electrodes composed of a pulse electrode and an earth electrode placed in such a manner that at least one of them is in contact with the above-described honeycomb filter, the plasma generation electrodes being capable of generating nonthermal plasma between the above-described pulse electrode and the above-described earth electrode, wherein the particulate matter contained in the above-described exhaust gas flowing into the above-described casing is collected by the above-described honeycomb filter, nitrogen monoxide contained in the above-described exhaust gas is oxidized to nitrogen dioxide by the nonthermal plasma generated between the above-described pulse electrode and the above-described earth electrode constituting the above-described plasma generation electrodes, combustible materials in the above-described particulate matter collected and deposited on the surface of the above-described partition walls are removed through oxidation by the above-described nitrogen dioxide produced and, thereby, the above-described honeycomb filter can be regenerated (hereafter may be referred to as a "second aspect").

[3] The exhaust gas treatment apparatus according to the above-described [1] or [2], further including a power source to apply a voltage to the above-described pulse electrode.

[4] The exhaust gas treatment apparatus according to any one of the above-described [1] to [3], wherein the above-described plasma generation electrodes are placed on outer perimeter surfaces of the above-described honeycomb filter by a printing method through the use of a metal paste.

[5] The exhaust gas treatment apparatus according to any one of the above-described [1] to [4], wherein the material for the above-described honeycomb filter is at least one material selected from the group consisting of cordierite, silicon carbide, SIALON, and silicon nitride.

[6] The exhaust gas treatment apparatus according to any one of the above-described [1] to [5], wherein the cell density of the above-described honeycomb filter is 15 to 60 cells/$cm^2$, the thickness of the above-described partition walls is 0.2 to 0.5 mm, and the depth of plugging of the cell at end surfaces of the above-described honeycomb filter is 1 to 20 mm.

[7] The exhaust gas treatment apparatus according to any one of the above-described [1] to [6], further including a dehydration device on the upstream side of the above-described exhaust system of the above-described casing in order to remove water contained in at least a part of the above-described exhaust gas flowing into the above-described casing.

[8] The exhaust gas treatment apparatus according to any one of the above-described [1] to [7], wherein a catalyst is held on the surface and/or in the inside of the above-described partition walls of the above-described honeycomb filter.

[9] The exhaust gas treatment apparatus according to any one of the above-described [1] to [8], further including a $NO_x$ treatment device on the downstream side of the above-described exhaust system of the above-described casing.

[10] The exhaust gas treatment apparatus according to any one of the above-described [3] to [9], wherein a current supplied from the above-described power source is a direct current with a voltage of at least 1 kV, a pulsed current with a peak voltage of at least 1 kV and the number of pulses of at least 1 per second, an alternating current with a peak voltage of at least 1 kV and a frequency of at least 1, or a current produced by superimposition of any two of them.

[11] The exhaust gas treatment apparatus according to any one of the above-described [1] to [10], placed in an exhaust system of a combustion gas of a diesel engine.

BEST MODE FOR CARRYING OUT THE INVENTION

Figure 1:
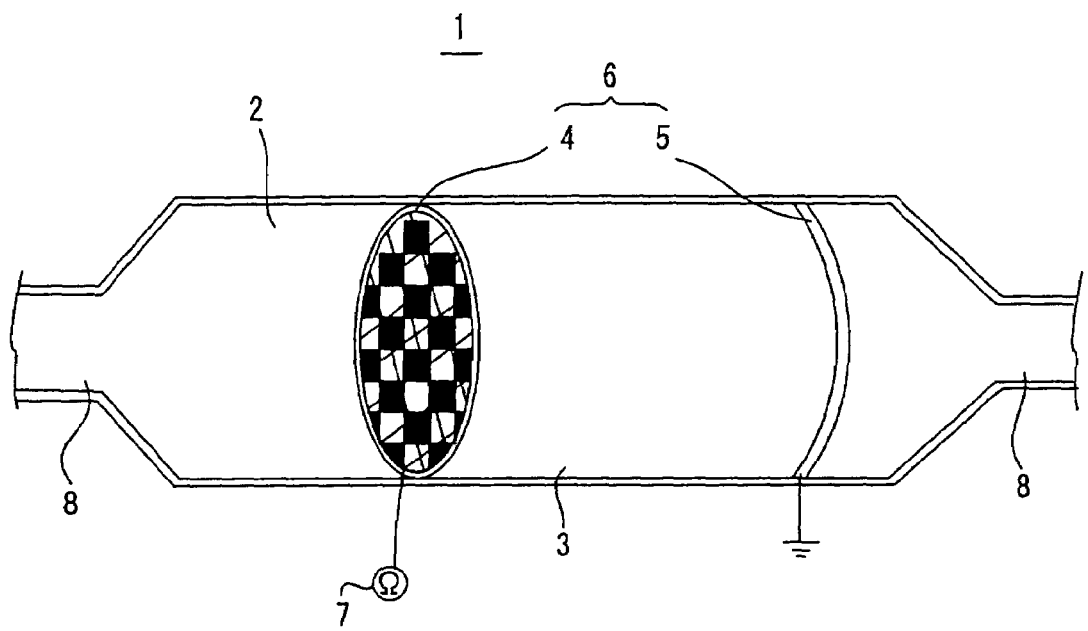
FIG. 1 is a perspective view schematically showing an embodiment of an exhaust gas treatment apparatus of the present invention (first aspect).

The embodiments of an exhaust gas treatment apparatus of the present invention will be described below in detail with reference to the drawings. However, the interpretation of the present invention is not limited to them. Various changes, modifications, and improvements within the scope of the present invention can be made based on the knowledge of one skilled in the art.

An embodiment of an exhaust gas treatment apparatus of the present invention (first aspect) will be described with reference to FIG. 1. The exhaust gas treatment apparatus 1 of the present embodiment is an exhaust gas treatment apparatus 1 used for cleaning an exhaust gas emitted from a diesel engine of an automobile. This exhaust gas treatment apparatus 1 is an exhaust gas treatment apparatus 1 placed in an exhaust system 8 of a combustion gas and used for collecting and removing particulate matter contained in the exhaust gas.

The treatment apparatus 1 is characterized by including a casing 2 connected to the exhaust system 8 to serve as a main flow path of the exhaust gas; a honeycomb filter 3 placed in the inside of the casing 2 in such a manner that interrupts the main flow path, the honeycomb filter 3 having a plurality of cells partitioned by partition walls to serve as filter flow paths of the exhaust gas and collecting the particulate matter contained in the exhaust gas; and plasma generation electrodes 6 composed of a pulse electrode 4 and an earth electrode 5 placed being faced each other by sandwiching the honeycomb filter 3 there, the plasma generation electrodes 6 being capable of generating nonthermal plasma between the pulse electrode 4 and the earth electrode 5, wherein the particulate matter contained in the exhaust gas flowing into the casing 2 is collected by the honeycomb filter 3, nitrogen monoxide contained in the exhaust gas is oxidized to nitrogen dioxide by the nonthermal plasma generated between the pulse electrode 4 and the earth electrode 5 constituting the plasma generation electrodes 6, combustible materials, e.g., soot, in the particulate matter collected and deposited on the surface of the partition walls are removed through oxidation by the nitrogen dioxide produced and, thereby, the honeycomb filter 3 can be regenerated. In the configuration of the present embodiment, the pulse electrode 4 is placed on an exhaust-gas-inlet-side end surface of the honeycomb filter 3, and the earth electrode 5 is placed on an exhaust-gas-outlet-side end surface.

By adopting such a configuration, particulate matter contained in the exhaust gas is highly precisely collected with the honeycomb filter 3, soot in the collected particulate matter is removed simply by oxidation at low energy, and the honeycomb filter can be regenerated. In addition, the apparatus can be miniaturized compared with a known exhaust gas treatment apparatus through the use of nonthermal plasma. In the present embodiment, since the nonthermal plasma is generated in such a manner that covers the entire honeycomb filter 3, the exhaust gas containing $NO_2$ produced through oxidation can be reacted with soot and the like while being in an excited state, and by the nonthermal plasma, the soot and the like deposited on the partition walls of the honeycomb filter becomes in the condition of being readily reacted. Consequently, the reaction efficiency can be increased. Furthermore, since radicals of ozone ($O_3$) and the like generated by the nonthermal plasma can also be reacted with soot and the like before the energy is lost, the reaction efficiency can be increased, and the regeneration time of the honeycomb filter 3 can be reduced.

In the present embodiment, preferably, a power source 7 to apply a voltage to a pulse electrode 4 is further included. In the case where this exhaust gas treatment apparatus 1 is placed in an automobile or the like, the use of an automotive battery or the like may be shared. However, by adopting the above-described configuration, stable nonthermal plasma can be generated.

In the present embodiment, preferably, a current supplied from the power source 7 is a direct current with a voltage of at least 1 kV, a pulsed current with a peak voltage of at least 1 kV and the number of pulses of at least 1 per second, an alternating current with a peak voltage of at least 1 kV and a frequency of at least 1, or a current produced by superimposition of any two of them. By adopting such a configuration, nonthermal plasma capable of further efficiently oxidizing NO to $NO_2$ can be generated.

The material for the casing 2 used in the present embodiment is not specifically limited as long as nonthermal plasma can be effectively generated therein. Examples of suitable materials can include alumina. In the configuration, a heater or the like may be placed on an outer perimeter surface and/or in the inside of the casing 2 in order that the temperature in the exhaust gas treatment apparatus 1 can be controlled.

Figure 2:
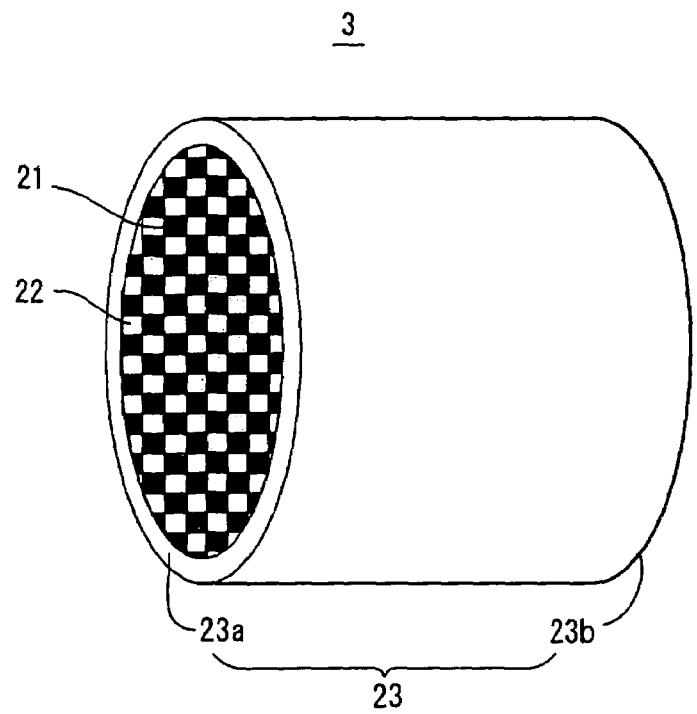
FIG. 2 is a perspective view showing a honeycomb filter used in an embodiment of the exhaust gas treatment apparatus of the present invention (first aspect).

As shown in FIG. 2, the honeycomb filter 3 has a honeycomb structure in which a plurality of cells 22 partitioned by partition walls 21 to serve as filter flow paths of an exhaust gas are included and these cells 22 are plugged alternately at an exhaust-gas-inlet-side end surface 23*a* and an exhaust-gas-outlet-side end surface 23*b*. The exhaust gas is introduced into the honeycomb filter 3 through cells 22 opened at the exhaust-gas-inlet-side end surface 23*a*, and is forced to pass through the partition walls 21 in the honeycomb filter 3, so that particulate matter in the exhaust gas is collected and removed with the honeycomb filter 3.

Preferably, the material for the above-described honeycomb filter 3 is at least one material selected from the group consisting of cordierite, silicon carbide, SIALON, and silicon nitride. In the present embodiment, preferably, the cell density of the honeycomb filter 3 is 15 to 60 cells/cm$^2$, the thickness of the partition walls 21 is 0.2 to 0.5 mm, and the depth of plugging of the cell at end surfaces 23 of the honeycomb filter 3 is 1 to 20 mm. If the cell density is less than 15 cells/cm$^2$, the efficiency of collection of particulate matter in the exhaust gas may be reduced. If the cell density exceeds 60 cells/cm$^2$, the back pressure of the honeycomb filter 3 is increased, and a load may be applied to a diesel engine. If the thickness of the partition walls 21 is less than 0.2 mm, the mechanical strength of the honeycomb filter 3 is reduced, and the honeycomb filter 3 may be damaged, for example. If the thickness of the partition walls 21 exceeds 0.5 mm, the back pressure of the honeycomb filter 3 is increased, and a load may be applied to the diesel engine. If the depth of plugging of the cell at end surfaces 23 is less than 1 mm, plugging portions of the end surfaces 23 may be damaged during the treatment of the exhaust gas. If the depth of plugging of the cell at the end surfaces 23 exceeds 20 mm, the effective area of a region of the honeycomb filter 3 to substantially collect particulate matter in the exhaust gas may be reduced.

The shape of the honeycomb filter 3 shown in FIG. 1 and FIG. 2 is a cylinder. However, the shape is not limited to this, and may be a quadrangular prism or other shape. Furthermore, the shape of a cross section of the cell 22 perpendicular to a direction of the flow is not limited to a quadrangle as well, and may be a circle, an ellipse, a triangle, substantially a triangle, or other polygon.

Preferably, the material used for the pulse electrode 4 and the earth electrode 5 is a metal having a high electrical conductivity. Examples of suitable materials may include a metal containing at least one component selected from the group consisting of iron, gold, silver, copper, titanium, aluminum, nickel, and chromium. The electrodes suitable for the use are formed into the shape that does not cause application of any back pressure to the exhaust system 8, for example, into the shape of a net, stripe, or the like.

The pulse electrode 4 and the power source 7 are placed while being electrically connected to each other, and the earth electrode 5 is placed while being grounded. In the case where the exhaust gas treatment apparatus 1 of the present embodiment is placed in an automobile or the like, the earth electrode 5 may be configured to electrically connect to an earth of the automobile or the like.

In the configuration shown in FIG. 1, the pulse electrode 4 and the earth electrode 5 are placed at a distance from the end surface of the honeycomb filter 3. However, it is essential to the present embodiment only that the two electrodes are placed being faced each other by sandwiching the honeycomb filter 3 there, and one of them may be in contact with the honeycomb filter 3. In the case where at least one electrically insulating material selected from the group consisting of cordierite, SIALON, silicon nitride, and the like is used as the material for the honeycomb filter 3, both the pulse electrode 4 and the earth electrode 5 may be in contact with the end surfaces of the honeycomb filter 3, in the configuration.

In the case where at least one of the pulse electrode 4 and the earth electrode 5 is placed to become in contact with the end surface of the honeycomb filter 3, preferably, the disposition is performed by a printing method through the use of a metal paste. Specifically, the metal paste is applied to the cross section of the partition walls or the plugging of the cell on the end surface of the honeycomb filter 3, followed by drying and sintering, so that the electrode can be placed on the end surface of the honeycomb filter 3.

Preferably, a catalyst is held on the surface and/or in the inside of the partition walls of the honeycomb filter 3 used in the present embodiment. By adopting such a configuration, for example, when the diesel engine is operated under low-speed and light-load conditions, and the temperature of the exhaust system is low, NO is oxidized to $NO_2$ by generating the nonthermal plasma with the plasma generation electrodes 6. When the diesel engine becomes normally operated, and the temperature of the exhaust system reaches, for example, 400° C. to 500° C., at which the catalyst is activated, the oxidation reaction can be performed by using the nonthermal plasma and the catalyst simultaneously or by using the catalyst alone while the generation of the nonthermal plasma is stopped. Consequently, the efficiency of the oxidation of NO in the exhaust gas to $NO_2$ can be increased and, in addition, the power consumption for generating the nonthermal plasma can be reduced. The kind of catalyst is not specifically limited. Examples of preferable catalysts can include catalysts containing at least one selected from the group consisting of Pt, Pd, Rh, K, Ba, Li, and Na.

Figure 3:
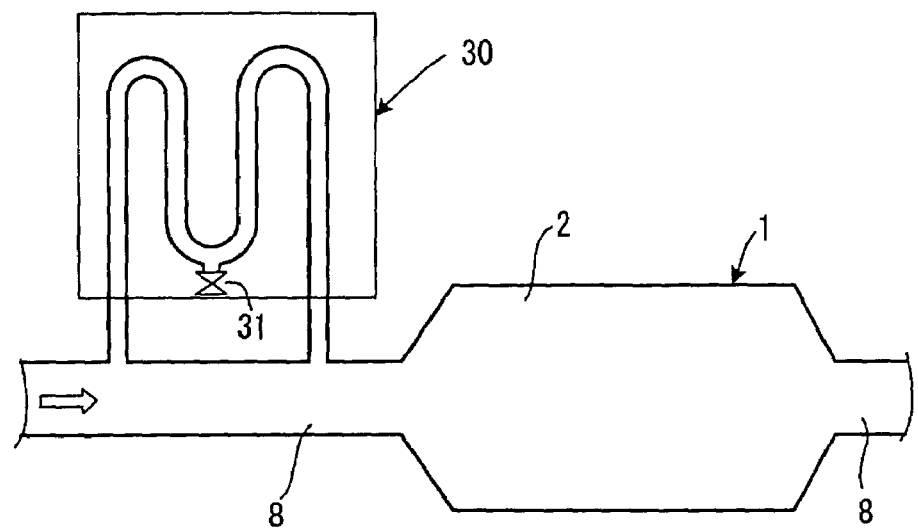
FIG. 3 is an explanatory diagram schematically showing the condition in which an embodiment of the exhaust gas treatment apparatus of the present invention (first aspect) further includes a dehydration device.

As shown in FIG. 3, preferably, the exhaust gas treatment apparatus 1 of the present embodiment further includes a dehydration device 30 on the upstream side of the exhaust system 8 of the casing 2 in order to remove water contained in at least a part of the exhaust gas flowing into the casing 2. The dehydration device 30 used in the present embodiment cools the exhaust gas with a heat exchanger, and emit liquefied water through a drain 31. The nonthermal plasma also intrinsically oxidizes and excites molecules other than NO contained in the exhaust gas and, thereby, the exhaust gas containing large amounts of water reduces the efficiency of oxidation of NO to $NO_2$. In particular, an exhaust gas resulting from combustion frequently contains large amounts of water. Therefore, by adopting the configuration in which the exhaust gas treatment apparatus 1 further includes the dehydration device 30, the efficiency of the oxidation of NO to $NO_2$ can be increased and, in addition, the power consumption for generating the nonthermal plasma can be reduced.

The dehydration device 30 to dehydrate the exhaust gas by cooling was described with reference to FIG. 3. Examples of dehydration devices may include a dehydration device in which an exhaust gas is compressed to increase the partial pressure of water and, thereafter, dehydration is performed and a dehydration device in which water is adsorbed by an adsorbent, as long as the dehydration devices can remove water in the exhaust gas. Any positional relationship between the casing 2 and the dehydration device 30 is acceptable as long as the dehydration device 30 is located at the position on the upstream side of the exhaust system 8. The casing 2 may be either in contact with or separated from the dehydration device 30.

Figure 4:
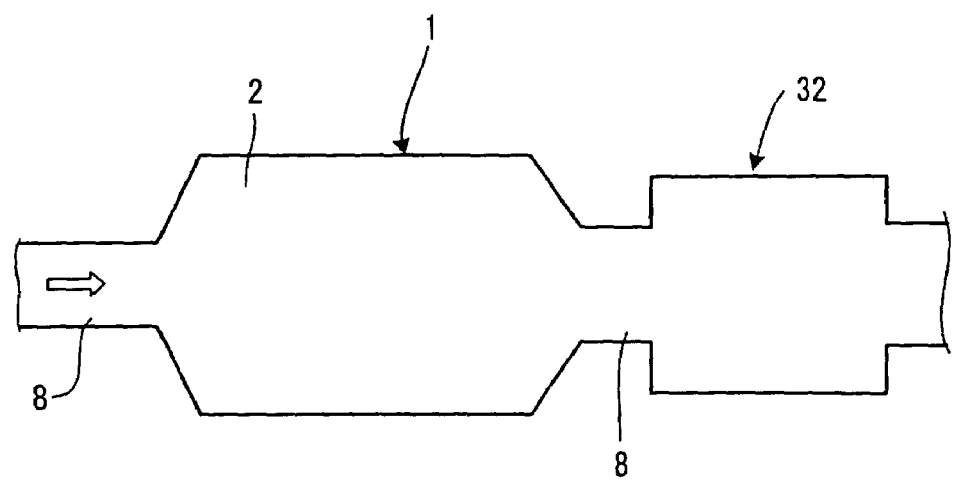
FIG. 4 is an explanatory diagram schematically showing the condition in which an embodiment of the exhaust gas treatment apparatus of the present invention (first aspect) further includes a $NO_x$ treatment device.

As shown in FIG. 4, preferably, the exhaust gas treatment apparatus 1 of the present embodiment further includes a $NO_x$ treatment device 32 on the downstream side of the exhaust system 8 of the casing 2. By adopting such a configuration, a gas treated in the exhaust gas treatment apparatus 1 can be emitted to the outside while not containing hazardous substance, $NO_x$. Examples of preferable $NO_x$ treatment devices 32 can include a honeycomb structure carrying a $NO_x$ absorption-reduction catalyst and urea SCR (Selective Catalytic Reduction). Any positional relationship between the casing 2 and the $NO_x$ treatment device 32 is acceptable as long as the $NO_x$ treatment device 32 is located at the position on the downstream side of the exhaust system 8. The casing 2 may be either in contact with or separated from the $NO_x$ treatment device 32.

Figure 5:
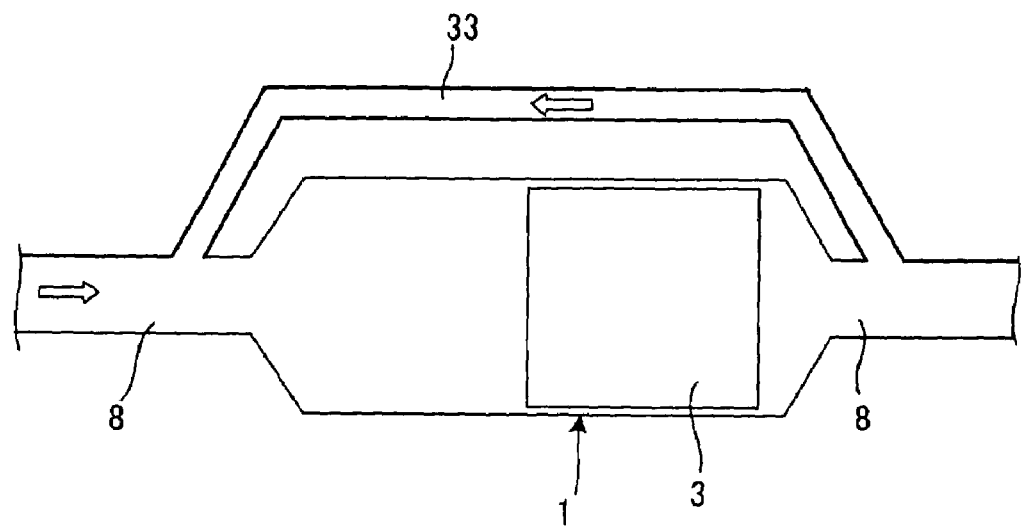
FIG. 5 is an explanatory diagram schematically showing the condition in which an embodiment of the exhaust gas treatment apparatus of the present invention (first aspect) includes a bypass.

As shown in FIG. 5, the exhaust gas treatment apparatus 1 of the present embodiment may have a configuration in which a bypass 33 is placed to return an exhaust gas passed through the honeycomb filter 3 to the upstream side of the exhaust system 8 and, thereby, the exhaust gas is circulated in the treatment apparatus 1. Since $NO_2$ produced by the nonthermal plasma is reduced to NO through the reaction with soot deposited on the partition walls of the honeycomb filter 3, the efficiency of removal of soot can be increased by returning the exhaust gas after passing through the honeycomb filter to the upstream side of the exhaust system 8 again for establishing circulation.

Figure 6:
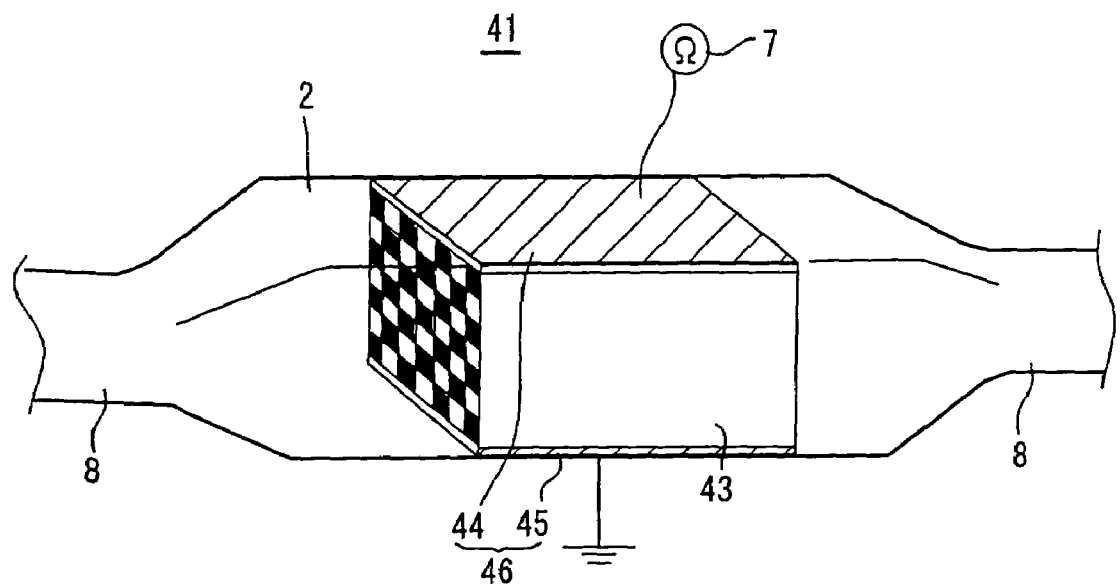
FIG. 6 is a perspective view schematically showing another embodiment of the exhaust gas treatment apparatus of the present invention (first aspect).

Another embodiment of the exhaust gas treatment apparatus of the present invention (first aspect) will be described below with reference to FIG. 6. As shown in FIG. 6, an exhaust gas treatment apparatus 41 of the present embodiment is configured similarly to the exhaust gas treatment apparatus 1 shown in FIG. 1 except that a pulse electrode 44 and an earth electrode 45 are placed on opposite outer perimeter surfaces of a honeycomb filter 43 in the shape of a quadrangular prism. The common elements with the elements shown in FIG. 1 are indicated by the same reference numerals as those in FIG. 1 and explanations thereof will not be provided.

By adopting such a configuration, particulate matter contained in the exhaust gas is highly precisely collected with the honeycomb filter 43, soot and the like in the collected particulate matter is removed simply by oxidation at low energy, and the honeycomb filter 43 can be regenerated. In addition, the apparatus can be miniaturized compared with a known exhaust gas treatment apparatus through the use of the nonthermal plasma.

Preferably, the honeycomb filter 43 used in the present embodiment can be made of a material similar to that for the honeycomb filter 3 shown in FIG. 1. In particular, it is preferable that the honeycomb filter 43 is made of at least one electrically insulating material selected from the group consisting of cordierite, SIALON, and silicon nitride. The honeycomb filter 43 in which the outer perimeter surfaces of the honeycomb filter 43 are coated by using an electrically insulating material can also be preferably used.

The material suitable for the use as the material for the pulse electrode 44 and the earth electrode 45 constituting the plasma generation electrodes 46 can be similar to that for the pulse electrode 4 and the earth electrode 5 shown in FIG. 1. The pulse electrode 44 and the earth electrode 45 may be in any shape as long as these are oppositely placed on outer perimeter surfaces of the honeycomb filter 43 and the shapes are suitable for generating nonthermal plasma all over the honeycomb filter 43. The pulse electrode 44 and the power source 7 are placed while being electrically connected to each other, and the earth electrode 45 is placed while being grounded. In the case where the exhaust gas treatment apparatus 41 of the present embodiment is placed in an automobile or the like, the earth electrode 45 may be configured to electrically connect to an earth of the automobile or the like.

In the case where the pulse electrode 44 and the earth electrode 45 are placed in contact with opposite outer perimeter surfaces of the honeycomb filter 43, preferably, the electrode is prepared by a printing method through the use of the above-described metal paste.

The exhaust gas treatment apparatus 41 of the present embodiment may further include a dehydration device configured as in the above-described dehydration device on the upstream side of the exhaust system 8 of the casing 2 in order to remove water contained in at least a part of the exhaust gas flowing into the casing 2. A $NO_x$ treatment device configured as in the above-described $NO_x$ treatment device may be further included on the downstream side of the exhaust system 8 of the casing 2. The exhaust gas treatment apparatus 41 may have a configuration in which a bypass configured as in the above-described bypass is placed and the exhaust gas is circulated.

Figure 7:
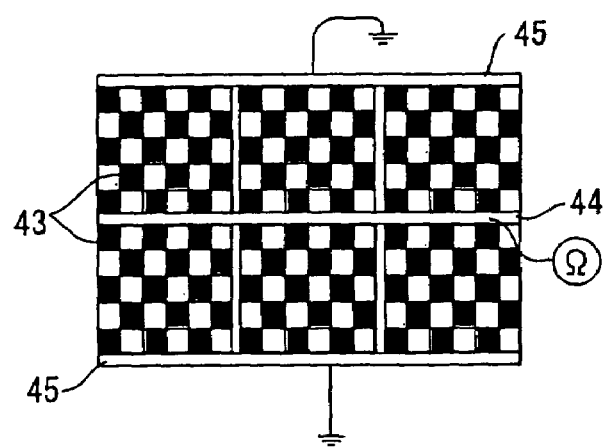
FIG. 7 is a plan view showing the case where a plurality of honeycomb filters are used in another embodiment of the exhaust gas treatment apparatus of the present invention (first aspect).

In the configuration of the present embodiment, as shown in FIG. 7, a plurality of honeycomb filter 43 (six filters in FIG. 7) may be combined, and the pulse electrode 44 and the earth electrode 45 may be placed on opposite outer perimeter surfaces of each honeycomb filter 43 in such a condition that nonthermal plasma is generated all over the plurality of honeycomb filters 43. By adopting such a configuration, even in a large capacity type exhaust gas treatment apparatus to treat an exhaust gas emitted from a large internal-combustion engine or the like, nonthermal plasma is generated all over the honeycomb filters 43, and the honeycomb filters 43 can be regenerated efficiently and uniformly.

An embodiment of an exhaust gas treatment apparatus of the present invention (second aspect) will be described below using FIG. 8. The exhaust gas treatment apparatus 51 of the present embodiment is an exhaust gas treatment apparatus 51 placed in an exhaust system 58 of a combustion gas and used for collecting and removing particulate matter contained in the exhaust gas. The treatment apparatus 51 is characterized by including a casing 52 connected to the exhaust system 58 to serve as a main flow path of the exhaust gas; a honeycomb filter 53 placed in the inside of the casing 52 in such a manner that interrupts the main flow path, the honeycomb filter 53 having a plurality of cells partitioned by partition walls to serve as filter flow paths of the exhaust gas and collecting the particulate matter contained in the exhaust gas; and plasma generation electrodes 56 composed of a pulse electrode 54 and an earth electrode 55 placed in such a manner that at least one of them is in contact with the honeycomb filter 53, the plasma generation electrodes 56 being capable of generating nonthermal plasma between the pulse electrode 54 and the earth electrode 55, wherein the particulate matter contained in the exhaust gas flowing into the casing 52 is collected by the honeycomb filter, nitrogen monoxide contained in the exhaust gas is oxidized to nitrogen dioxide by the nonthermal plasma generated between the pulse electrode 54 and the earth electrode 55 constituting the plasma generation electrodes 56, combustible materials, e.g., soot, in the particulate matter collected and deposited on the surface of the partition walls are removed through oxidation by the nitrogen dioxide produced and, thereby, the honeycomb filter 53 can be regenerated. In the configuration of the present embodiment, the rod-shaped pulse electrode 54 is placed while being inserted in cells of the honeycomb filter 53 from an exhaust-gas-inlet-side end surface to the vicinity of an exhaust-gas-outlet-side end surface, and the earth electrode 55 is placed on the outer perimeter surface of the honeycomb filter 53.

By adopting such a configuration, particulate matter contained in the exhaust gas is highly precisely collected with the honeycomb filter 53, soot in the collected particulate matter is removed simply by oxidation at low energy, and the honeycomb filter 53 can be regenerated. In addition, the apparatus can be miniaturized compared with a known exhaust gas treatment apparatus through the use of nonthermal plasma. In the present embodiment, since the nonthermal plasma is generated in the inside of the honeycomb filter 53, the exhaust gas containing $NO_2$ produced through oxidation can be reacted with soot and the like while being in an excited state, and by the nonthermal plasma, the soot and the like deposited on the partition walls of the honeycomb filter becomes in the condition of being readily reacted. Consequently, the reaction efficiency can be increased. Furthermore, since radicals of ozone ($O_3$) and the like generated by the nonthermal plasma can also be reacted with soot and the like before the energy is expended, the oxidation reaction can be accelerated, and the regeneration time of the honeycomb filter 53 can be reduced.

In the present embodiment, preferably, a power source 57 to apply a voltage to the pulse electrode 54 is further included. In the case where this exhaust gas treatment apparatus 51 is placed in an automobile or the like, the use of an automotive battery or the like may be shared. However, by adopting the above-described configuration, stable nonthermal plasma can be generated.

In the present embodiment, preferably, a current supplied from the power source 57 is configured as in the power source 7 shown in FIG. 1.

The material for the casing 52 used in the present embodiment is not specifically limited as long as nonthermal plasma can be effectively generated therein. Examples of suitable materials can include alumina.

The honeycomb filter 53 configured similarly to the honeycomb filter 3 used in the exhaust gas treatment apparatus shown in FIG. 1 is suitable for the use in the present embodiment. The shape of the honeycomb filter 53 is not limited to a cylinder, as described above.

Preferably, the material used for the pulse electrode 54 and the earth electrode 55 is a metal having a high electrical conductivity. Examples of suitable materials can include a metal containing at least one component selected from the group consisting of iron, gold, silver, copper, titanium, aluminum, nickel, and chromium. In the present embodiment, the shape of the pulse electrode 54 is the shape of a rod having substantially the same length as the length of the honeycomb filter 53, and the shape is suitable for being inserted into the cell of the honeycomb filter 53. The shape of the earth electrode 55 is the shape suitable for covering all over the outer perimeter surface of the honeycomb filter 53, and is configured to contact with the honeycomb filter 53. At this time, preferably, the earth electrode 55 is prepared by the printing method through the use of a metal paste.

Figure 8:
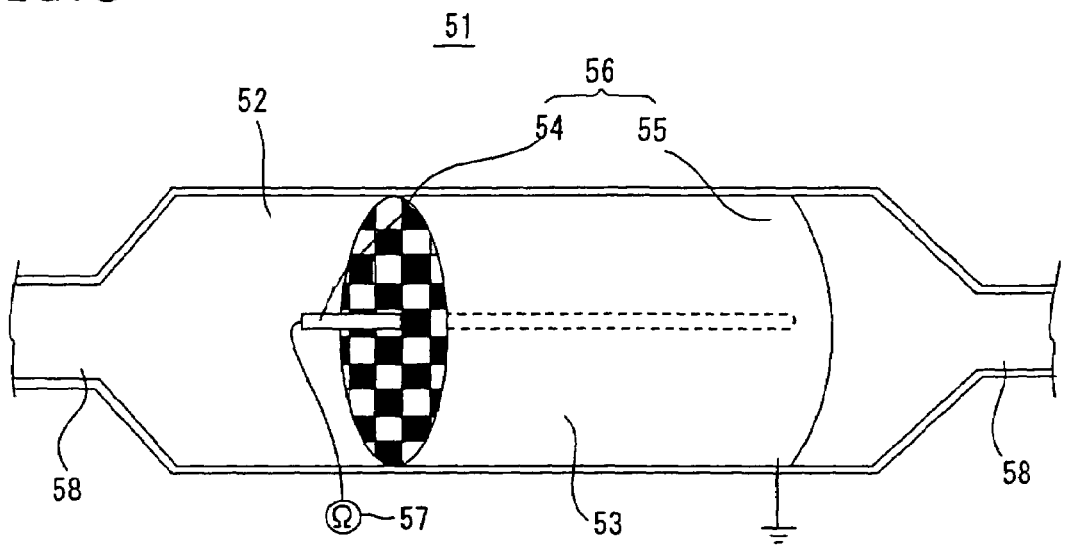
FIG. 8 is a perspective view schematically showing an embodiment of an exhaust gas treatment apparatus of the present invention (second aspect).

In the configuration of the present embodiment, it is essential only that at least one of the pulse electrode 54 and the earth electrode 55 is in contact with the honeycomb filter 53, and the shapes of the pulse electrode 54 and the earth electrode 55 are not limited to the specific shapes shown in FIG. 8. The pulse electrode 54 and the above-described power source 57 are placed while being electrically connected to each other, and the earth electrode 55 is placed while being grounded. In the case where the exhaust gas treatment apparatus 51 of the present embodiment is placed in an automobile or the like, the earth electrode 55 may be configured to electrically connect to an earth of the automobile or the like.

As described above, preferably, a catalyst is held on the surface and/or in the inside of the partition walls of the honeycomb filter 53 used in the present embodiment. By adopting such a configuration, effects similar to the effects in the exhaust gas treatment apparatus 1 shown in FIG. 1 can be attained.

The exhaust gas treatment apparatus 51 of the present embodiment may further include a dehydration device configured as in the above-described dehydration device on the upstream side of the exhaust system 58 of the casing 52 in order to remove water contained in at least a part of the exhaust gas flowing into the casing 52. A $NO_x$ treatment device configured as in the above-described $NO_x$ treatment device may be further included on the downstream side of the exhaust system 58 of the casing 52. The exhaust gas treatment apparatus 51 may have a configuration in which a bypass configured as in the above-described bypass is placed and the exhaust gas is circulated.

Figure 9:
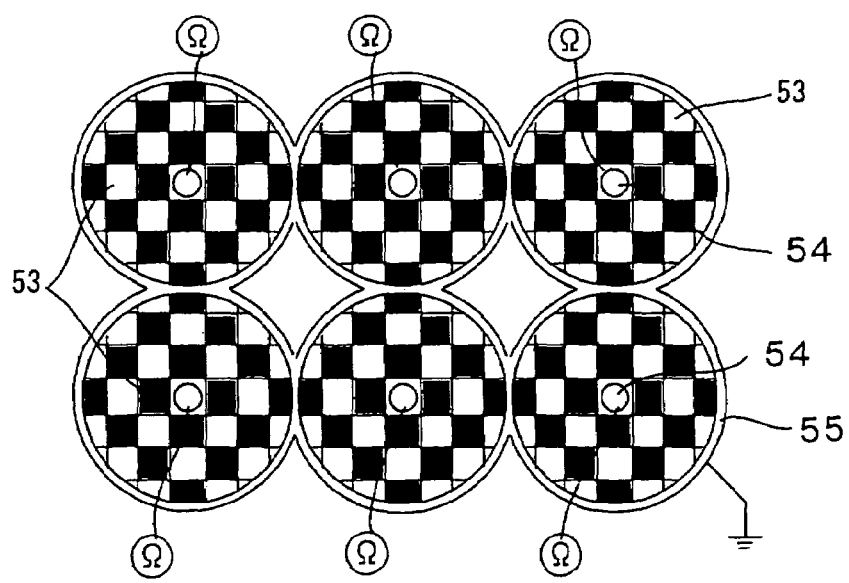
FIG. 9 is a plan view showing the case where a plurality of honeycomb filters are used in an embodiment of the exhaust gas treatment apparatus of the present invention (second aspect).

In the configuration of the present embodiment, as shown in FIG. 9, a plurality of honeycomb filter 53 (six filters in FIG. 9) may be combined, and the pulse electrode 54 and the earth electrode 55 may be placed on opposite outer perimeter surfaces of each honeycomb filter 53 in such a condition that nonthermal plasma is generated all over the plurality of honeycomb filters 53. By adopting such a configuration, even in the case where the exhaust gas treatment apparatus is placed in an exhaust system of a large internal-combustion engine or the like, nonthermal plasma is generated all over the honeycomb filters 53, and the honeycomb filters 53 can be regenerated efficiently and uniformly.

Figure 10:
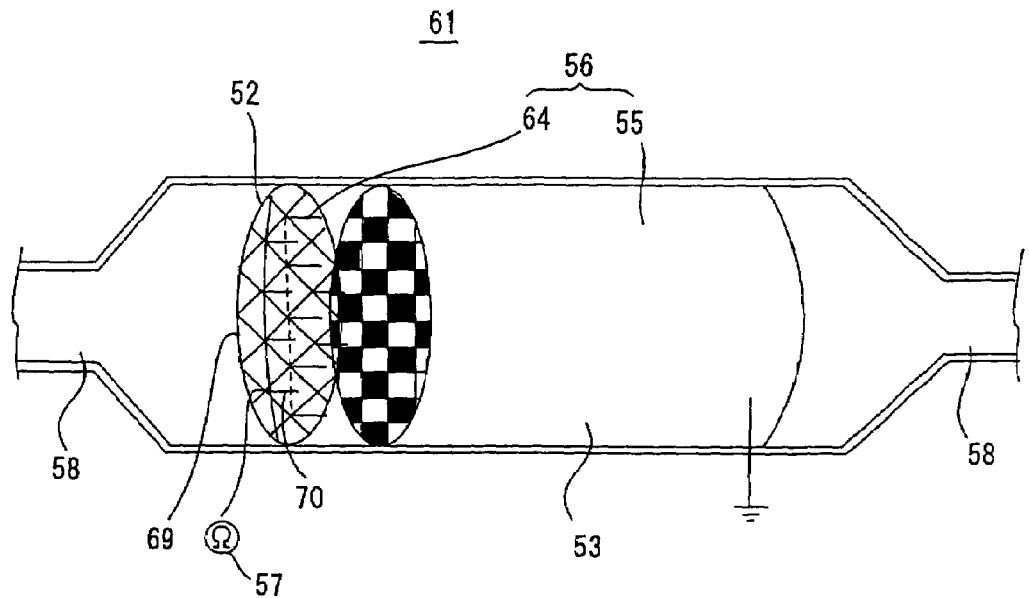
FIG. 10 is a perspective view schematically showing another embodiment of the exhaust gas treatment apparatus of the present invention (second aspect).

Another embodiment of the exhaust gas treatment apparatus of the present invention (second aspect) will be described below with reference to FIG. 10. As shown in FIG. 10, an exhaust gas treatment apparatus 61 of the present embodiment is configured similarly to the exhaust gas treatment apparatus 51 shown in FIG. 8 except that a pulse electrode 64 is formed by disposing a plurality of metal needles 70 on a net-shaped insulating plate 69. The common elements with the elements shown in FIG. 8 are indicated by the same reference numerals as those in FIG. 8 and explanations thereof will not be provided.

By adopting such a configuration, since the nonthermal plasma is generated in the vicinity of the exhaust-gas-inlet-side end surface of the honeycomb filter 53, the exhaust gas containing $NO_2$ produced through oxidation by the nonthermal plasma can be reacted with soot and the like while being in an excited state. Consequently, effects similar to the effects in the above-described exhaust gas treatment apparatus can be attained.

The present invention will be specifically described below with reference to the examples. However, the present invention is not limited to these examples.

EXAMPLE 1

In the present example, as shown in FIG. 6, the exhaust gas treatment apparatus 41 was prepared, in which the honeycomb filter 43 formed by using cordierite having a high electrically-insulating property was placed in the inside of the acrylic resin casing 2 for serving as a main flow path of an exhaust gas in such a manner that interrupts this main flow path, and the stainless steel pulse electrode 44 having a mesh size of 2.6 mm×2.6 mm and the fluororesin-coated stainless steel earth electrode 45 having a mesh size of 2.6 mm×2.6 mm were placed on opposite outer perimeter surfaces of this honeycomb filter 43.

With respect to the shape of the honeycomb filter 43, the length in the direction of the flow of the exhaust gas was 152 mm, the end surfaces were quadrangular prism of 48 mm in width×24 mm in height, the cell density was 16 cells/cm$^2$, and the thickness of the partition walls was 0.43 mm, while the honeycomb filter 43 was formed by extrusion with a metal base.

A high voltage pulse power source (produced by NGK INSULATORS, LTD.) including an SI thyristor as a switching element was used as the power source. This high voltage pulse power source can apply a maximum voltage of about 45 kV at rated load and the frequency can be changed within the range of 80 to 500 Hz.

Figure 11:
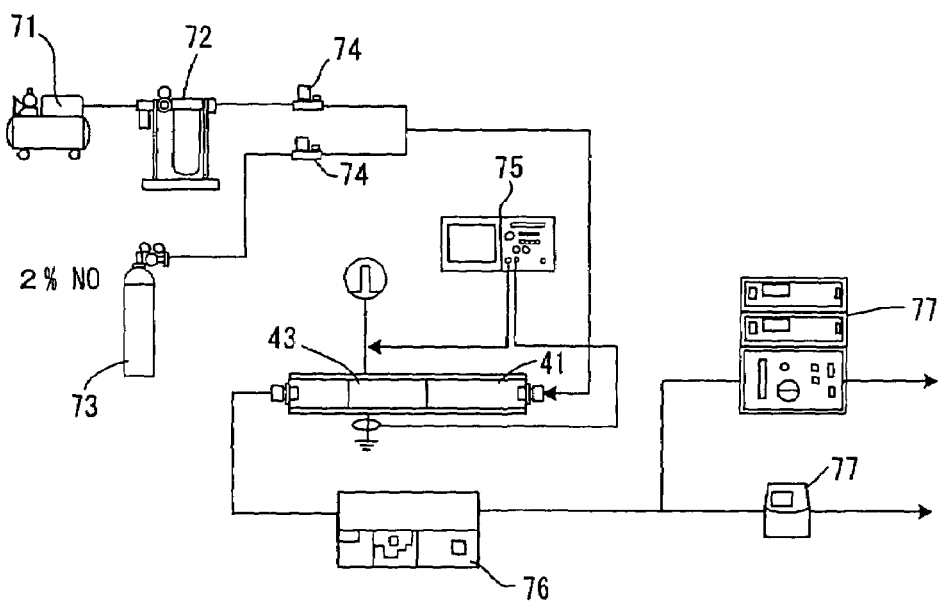
FIG. 11 is a schematic diagram of an entire configuration to perform various measurements of an exhaust gas treatment apparatus, in Example 1 of the present invention.
Figure 12:
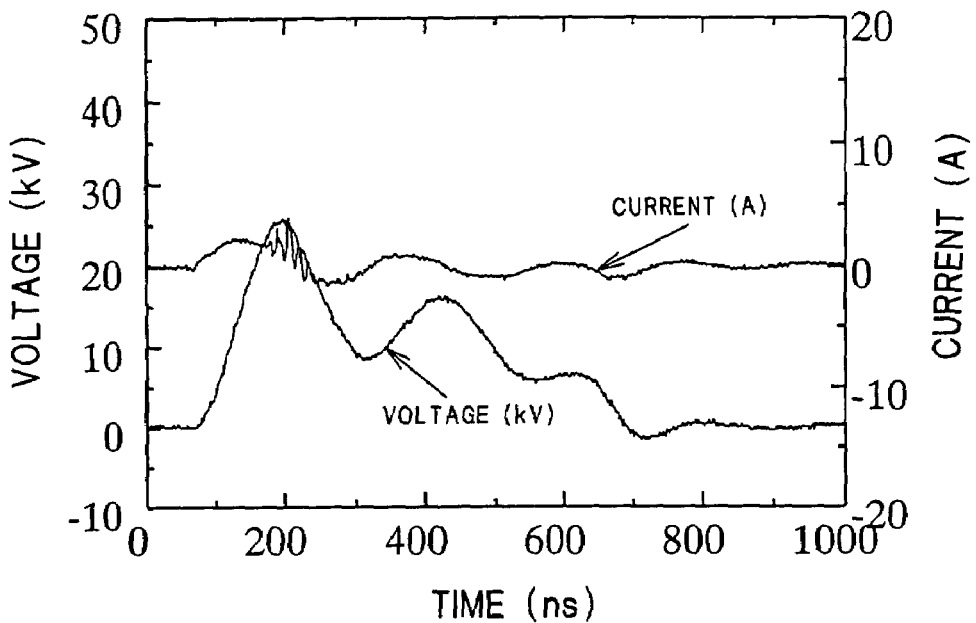
FIG. 12 is a graph showing the voltage applied to plasma generation electrodes in the exhaust gas treatment apparatus and the current thereby passed, in Example 1 of the present invention.

As shown in FIG. 11, a NO mixture gas was prepared by independently adjusting dry air and a NO gas at predetermined concentrations and flow rates by using mass flow controllers 74. The dry air was prepared by compressing external air with a compressor 71, removing fine particles with a filter 72, and removing water with a drying agent. The NO gas was supplied from a gas cylinder 73 filled with 2% NO mixture gas. The resulting NO mixture gas was introduced into the exhaust gas treatment apparatus 41 prepared as described above. The applied voltage and the current were measured with an oscilloscope (DL1740-1GS/s: produced by Yokogawa Electric Corporation) 75, a high voltage probe (P6015A: produced by Sony/Tektronix Corporation), and a current probe (P6021: produced by Sony/Tektronix Corporation). The measurement results are shown in FIG. 12. The discharge power was determined by multiplying the positive area of a waveform of the product of waveforms of the voltage and the current observed with the oscilloscope 75 by the pulse frequency.

Figure 13:
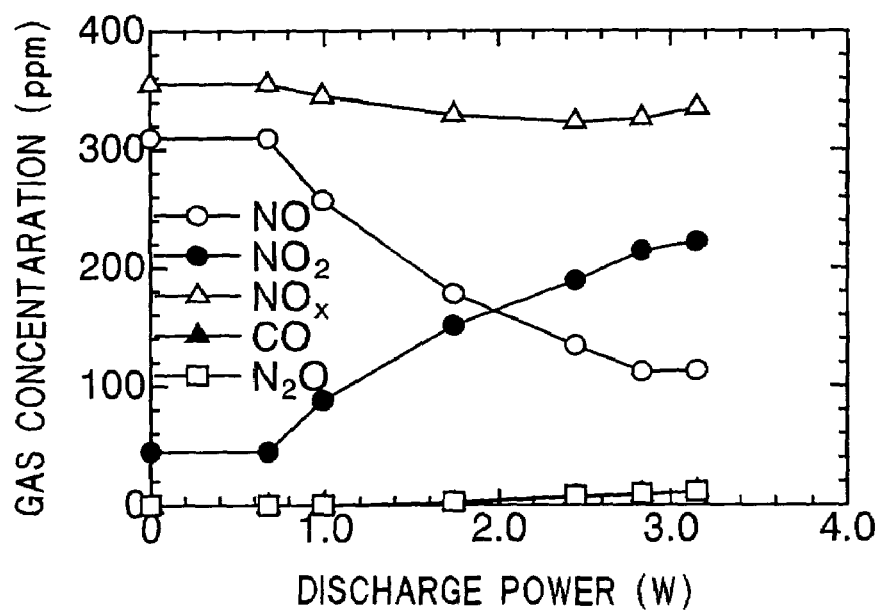
FIG. 13 is a graph showing the relationship between the concentrations of NO, $NO_2$, $NO_x$, and $N_2O$ and the elapsed time when nonthermal plasma is generated under the condition in which no soot is deposited in the honeycomb filter, in Example 1 of the present invention.

A voltage was applied with the high voltage pulse power source to perform a plasma treatment. The concentrations of NO, $NO_2$, $NO_x$, and $N_2O$ in the treated gas after passing through a heater 76 to remove ozone were measured with a gas analyzer. The measurement results are shown in FIG. 13. The maximum amount of reduction of NO was 197 ppm and, therefore, about 70% of NO was able to be oxidized to $NO_2$.

Figure 14:
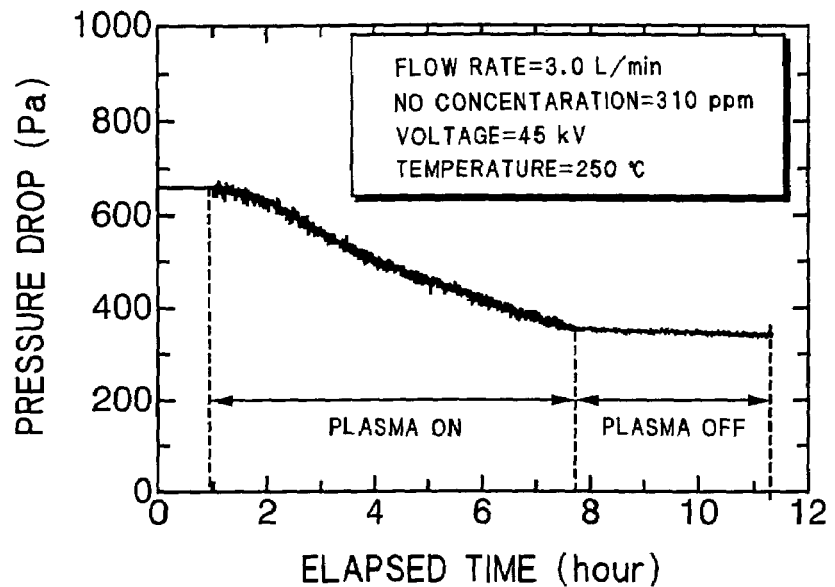
FIG. 14 is a graph showing the relationship between the pressure drop of the honeycomb filter and the elapsed time when nonthermal plasma is generated under the condition in which soot has been deposited in the honeycomb filter, in Example 1 of the present invention.

Subsequently, 2.1 g/L of soot was deposited in the honeycomb filter 43 of the exhaust gas treatment apparatus 41. The NO mixture gas adjusted to have a NO concentration of 310 ppm was introduced while the temperature of the end surface of the honeycomb filter 43 was maintained at 250° C. Nonthermal plasma was generated between the pulse electrode and the earth electrode, and the pressure drop of the honeycomb filter 43 was measured. The measurement results of the pressure drop of the honeycomb filter 43 versus the elapsed time are shown in FIG. 14. At the same time, the concentrations of NO, $NO_2$, $NO_x$, $N_2O$, CO, $CO_2$, and $O_2$ in the exhaust gas treated with the exhaust gas treatment apparatus 41 (refer to FIG. 11) were measured with a gas analyzer 77 (refer to FIG. 11). The measurement results are shown in FIG. 15.

As is clear from the graph shown in FIG. 14, the pressure drop of the honeycomb filter 43 (refer to FIG. 11) is reduced during the generation of nonthermal plasma, so that the honeycomb filter 43 (refer to FIG. 11) is regenerated.

Figure 15:
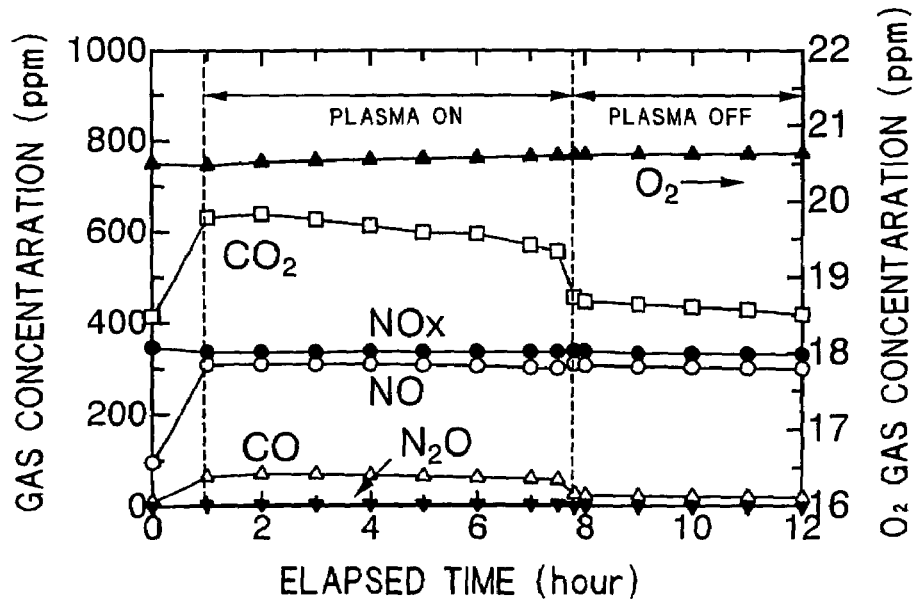
FIG. 15 is a graph showing the relationship between the concentrations of NO, $NO_2$, $NO_x$, $N_2O$, CO, $CO_2$, and $O_2$ and the elapsed time when nonthermal plasma is generated under the condition in which soot has been deposited in the honeycomb filter, in Example 1 of the present invention.

As is clear from the graph shown in FIG. 15, no increase in concentration of $NO_2$ is observed during the generation of nonthermal plasma in contrast with the $NO_2$ increase shown in FIG. 13 and the concentrations of $CO_2$ and CO are increased, so that most of $NO_2$ produced through oxidation by nonthermal plasma is reacted with soot.

After the above-described measurements were completed, the honeycomb filter 43 (refer to FIG. 11) was taken out of the exhaust gas treatment apparatus 41 (refer to FIG. 11), and the inner surface and the outer surface of the honeycomb filter 43 (refer to FIG. 11) were observed. As a result, it was confirmed that soot was removed.

EXAMPLE 2

In the present example, an exhaust gas treatment apparatus similar to that in FIG. 10 was prepared, in which a honeycomb filter formed by using cordierite having a high electrically-insulating property was placed in the inside of a quartz glass casing for serving as a main flow path of an exhaust gas in such a manner that interrupts this main flow path, and a pulse electrode and an earth electrode were placed, the pulse electrode having a configuration in which a plurality of stainless steel needles of 7 mm in length were placed on a net-shaped stainless steel plate at a distance of 8 mm from each end surface of this honeycomb filter. In the present example, 4.1 g/L of soot was deposited in the honeycomb filter, and the mass of the honeycomb filter was 55.2525 g.

Figure 16:
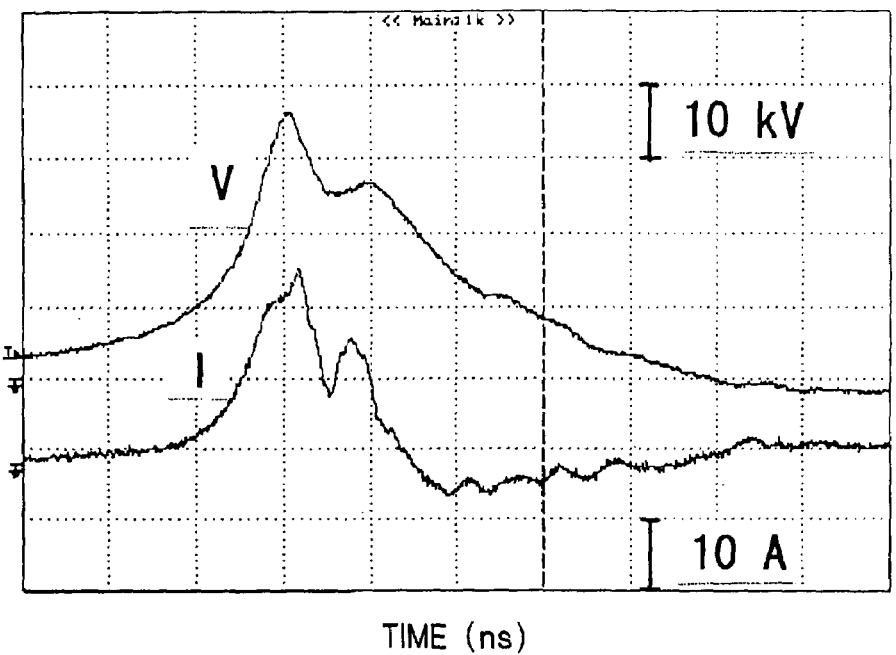
FIG. 16 is a graph showing the voltage applied to plasma generation electrodes in the exhaust gas treatment apparatus and the current thereby passed, in Example 2 of the present invention.
Figure 17:
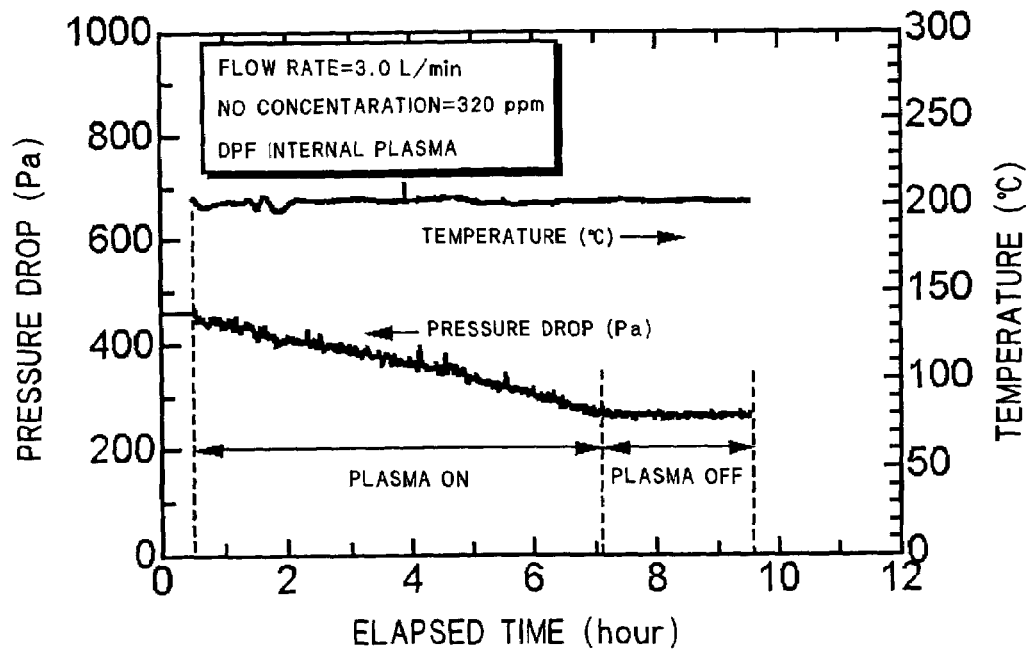
FIG. 17 is a graph showing the relationship between the pressure drop of the honeycomb filter and the elapsed time when nonthermal plasma is generated under the condition in which soot has been deposited in the honeycomb filter, in Example 2 of the present invention.
Figure 18:
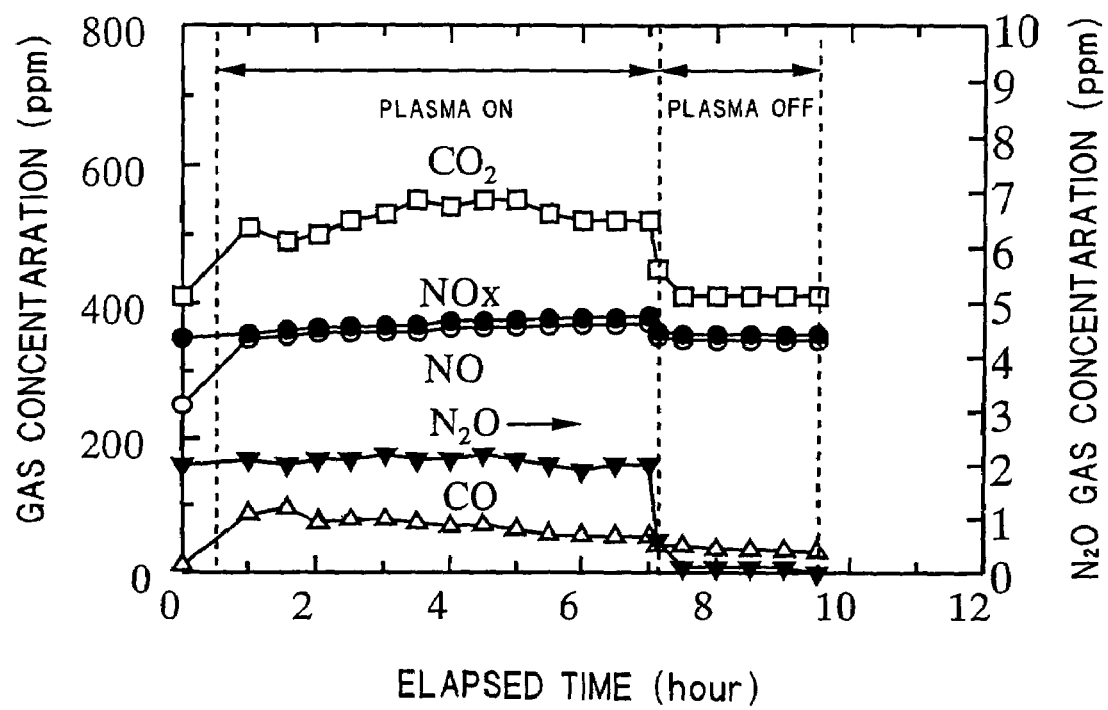
FIG. 18 is a graph showing the relationship between the concentrations of NO, $NO_2$, $NO_x$, $N_2O$, CO, $CO_2$, and $O_2$ and the elapsed time when nonthermal plasma is generated under the condition in which soot has been deposited in the honeycomb filter, in Example 2 of the present invention.
Figure 19:
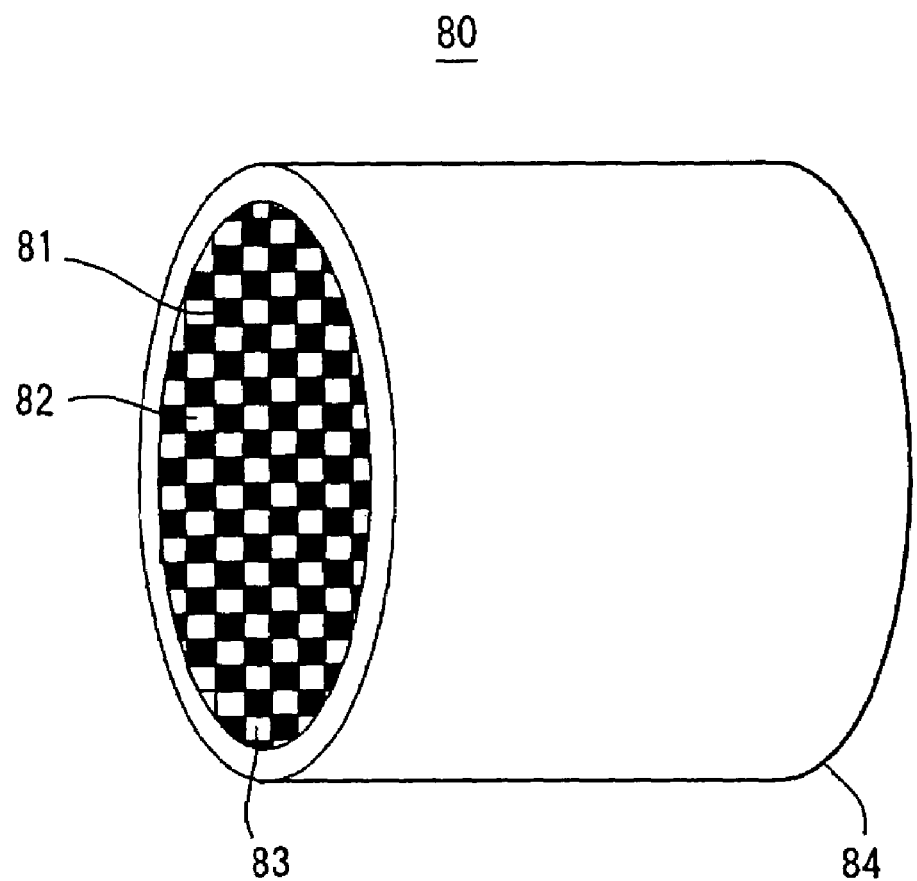
FIG. 19 is a perspective view showing a honeycomb filter used for a known exhaust gas treatment apparatus.

A measurement flow and measurement apparatus configured similarly to those shown in FIG. 11 were used. A NO mixture gas adjusted to have a NO concentration of 320 ppm was introduced at a flow rate of 3 L/min into the exhaust gas treatment apparatus prepared as described above while the temperature of the end surface of the honeycomb filter was maintained at 200° C. Nonthermal plasma was generated at a power consumption of 1.36 W, and the applied voltage and the current, the pressure drop of the honeycomb filter during the generation of nonthermal plasma, and the concentrations of NO, $NO_x$, $N_2O$, CO, and $CO_2$ in the exhaust gas treated with the exhaust gas treatment apparatus were measured. Each measurement result is shown in FIGS. 16 to 18.

In the present example as well, the pressure drop of the honeycomb filter is reduced during the generation of nonthermal plasma, and at the same time, the concentrations of $CO_2$ and CO are increased. Therefore, it is clear that the honeycomb filter is regenerated similarly to that in Example 1. According to the measurement of the mass of the honeycomb filter after the nonthermal plasma was generated, the mass was reduced to 55.0044 g and, therefore, the decrement was 0.2481 g. Consequently, it was confirmed that the soot deposited in the honeycomb filter was removed through oxidation. According to the measurement results shown in FIG. 18, since the concentrations increases of $CO_2$ and CO are larger than the amount of reduction of $NO_2$, it can be said that other radicals, e.g., O, OH, and $O_3$, oxidize soot by nonthermal plasma and enhance the regeneration of the honeycomb filter.

INDUSTRIAL APPLICABILITY

As described above, according to the present invention, an exhaust gas treatment apparatus can be provided, wherein the apparatus is capable of highly precisely collecting particulate matter contained in an exhaust gas with a honeycomb filter, removing combustible materials in the collected particulate matter simply by oxidation at low energy, and regenerating the honeycomb filter and, in addition, the apparatus can be miniaturized compared with a known exhaust gas treatment apparatus through the use of nonthermal plasma.

The invention claimed is:

1. An exhaust gas treatment apparatus placed in an exhaust system of a combustion gas, for collecting and removing particulate matter contained in an exhaust gas, the treatment apparatus comprising:

a casing connected to the exhaust system to serve as a main flow path of the exhaust gas;

a honeycomb filter placed in the inside of the casing in such a manner that it interrupts the main flow path, the honeycomb filter having a plurality of cells partitioned by partition walls to serve as filter flow paths of the exhaust gas and collecting the particulate matter contained in the exhaust gas; and plasma generation electrodes composed of a first electrode and an earth electrode, the plasma generation electrodes being capable of generating nonthermal plasma between the first electrode and the earth electrode, wherein the particulate matter contained in the exhaust gas flowing into the casing is collected by the honeycomb filter, nitrogen monoxide contained in the exhaust gas is oxidized to nitrogen dioxide by the nonthermal plasma generated between the first electrode and the earth electrode constituting the plasma generation electrodes, and combustible materials in the particulate matter collected and deposited on the surface of the partition walls are removed through oxidation by the nitrogen dioxide produced and thereby the honeycomb filter is regenerated, wherein the cells of the honeycomb filter are plugged alternatively at a gas inlet end and a gas outlet end of the honeycomb filter, so that the exhaust gas passes through the partition walls, and said first electrode and said earth electrode have one of the following arrangements:

(i) the electrodes are on opposite side faces of the honeycomb filter which has a rectangular cross section, the side faces extending parallel to the cells, (ii) the earth electrode is on the outer peripheral surface of the honeycomb filter, and surrounds the honeycomb filter, extending parallel to the cells, and the first electrode is a rod-shaped electrode inserted in a cell of the honeycomb filter and extending from the gas inlet end to the vicinity of the gas outlet end, (iii) the earth electrode is on the outer peripheral surface of the honeycomb filter, and surrounds the honeycomb filter, extending parallel to the cells, and the first electrode is formed as a plurality of needles on a net-shaped insulating plate arranged in front of the gas inlet end of the honeycomb filter.

2. An exhaust gas treatment apparatus placed in an exhaust system of a combustion gas, for collecting and removing particulate matter contained in an exhaust gas, the treatment apparatus comprising:

a casing connected to the exhaust system to serve as a main flow path of the exhaust gas;

a honeycomb filter placed in the inside of the casing in such a manner that it interrupts the main flow path, the honeycomb filter being made of a non-conductive material and having a plurality of cells partitioned by partition walls to serve as filter flow paths of the exhaust gas and collecting the particulate matter contained in the exhaust gas; and plasma generation electrodes composed of a first electrode and an earth electrode, the plasma generation electrodes being capable of generating nonthermal plasma between the first electrode and the earth electrode, wherein the particulate matter contained in the exhaust gas flowing into the casing is collected by the honeycomb filter, nitrogen monoxide contained in the exhaust gas is oxidized to nitrogen dioxide by the nonthermal plasma generated between the first electrode and the earth electrode constituting the plasma generation electrodes, and combustible materials in the particulate matter collected and deposited on the surface of the partition walls are removed through oxidation by the nitrogen dioxide produced and thereby the honeycomb filter is regenerated, wherein the cells of the honeycomb filter are plugged alternatively at a gas inlet end and a gas outlet end of the honeycomb filter, so that the exhaust gas passes through the partition walls, and one of the first electrode and the earth electrode is placed at one of the gas inlet end and the gas outlet end, and the other of the first electrode and the earth electrode is placed at the other of the gas inlet end and the gas outlet end.

3. The exhaust gas treatment apparatus according to claim 1, further comprising a power source to apply a voltage to the first electrode.

4. The exhaust gas treatment apparatus according to claim 2, further comprising a power source to apply a voltage to the first electrode.

5. The exhaust gas treatment apparatus according to claim 1, wherein the plasma generation electrodes are placed on outer perimeter surfaces of the honeycomb filter by a printing method through the use of a metal paste.

6. The exhaust gas treatment apparatus according to claim 2, wherein the plasma generation electrodes are placed on outer perimeter surfaces of the honeycomb filter by a printing method through the use of a metal paste.

7. The exhaust gas treatment apparatus according to claim 1, wherein the material for the honeycomb filter comprises at least one material selected from the group consisting of cordierite, silicon carbide, SIALON, and silicon nitride.

8. The exhaust gas treatment apparatus according to claim 2, wherein the material for the honeycomb filter comprises at least one material selected from the group consisting of cordierite, silicon carbide, SIALON, and silicon nitride.

9. The exhaust gas treatment apparatus according to claim 1, wherein the cell density of the honeycomb filter is 15 to 60 cells/cm$^2$, the thickness of the partition wall is 0.2 to 0.5 mm, and the depth of plugging of the cell at end surfaces of the honeycomb filter is 1 to 20 mm.

10. The exhaust gas treatment apparatus according to claim 2, wherein the cell density of the honeycomb filter is 15 to 60 cells/cm$^2$, the thickness of the partition wall is 0.2 to 0.5 mm, and the depth of plugging of the cell at end surfaces of the honeycomb filter is 1 to 20 mm.

11. The exhaust gas treatment apparatus according to claim 1, further comprising a dehydration device on the upstream side of the exhaust system of the casing in order to remove water contained in at least a part of the exhaust gas flowing into the casing.

12. The exhaust gas treatment apparatus according to claim 2, further comprising a dehydration device on the upstream side of the exhaust system of the casing in order to remove water contained in at least a part of the exhaust gas flowing into the casing.

13. The exhaust gas treatment apparatus according to claim 1, wherein a catalyst is held on the surface and/or in the inside of the partition walls of the honeycomb filter.

14. The exhaust gas treatment apparatus according to claim 2, wherein a catalyst is held on the surface and/or in the inside of the partition walls of the honeycomb filter.

15. The exhaust gas treatment apparatus according to claim 1, further comprising a $NO_x$ treatment device on the downstream side of the exhaust system of the casing.

16. The exhaust gas treatment apparatus according to claim 2, further comprising a $NO_x$ treatment device on the downstream side of the exhaust system of the casing.

17. The exhaust gas treatment apparatus according to claim 3, wherein a current supplied from the power source is a direct current with a voltage of at least 1 kV, a pulsed current with a peak voltage of at least 1 kV and the number of pulses of at least 1 per second, an alternating current with a peak voltage of at least 1 kV and a frequency of at least 1, or a current produced by superimposition of any two of them.

18. The exhaust gas treatment apparatus according to claim 4, wherein a current supplied from the power source is a direct current with a voltage of at least 1 kV, a pulsed current with a peak voltage of at least 1 kV and the number of pulses of at least 1 per second, an alternating current with a peak voltage of at least 1 kV and a frequency of at least 1, or a current produced by superimposition of any two of them.

19. The exhaust gas treatment apparatus according to claim 1, placed in an exhaust system of a combustion gas of a diesel engine.

20. The exhaust gas treatment apparatus according to claim 2, placed in an exhaust system of a combustion gas of a diesel engine.

* * * * *